(12) United States Patent
Xi et al.

(10) Patent No.: US 8,138,734 B2
(45) Date of Patent: Mar. 20, 2012

(54) ACCURATE CURRENT LIMIT FOR PEAK CURRENT MODE DC-DC CONVERTER

(75) Inventors: Xiaoyu Xi, Plano, TX (US); Jian Zhou, Plano, TX (US)

(73) Assignee: Monolithic Power Systems, Inc., San Jose, CA (US)

( * ) Notice: Subject to any disclaimer, the term of this patent is extended or adjusted under 35 U.S.C. 154(b) by 418 days.

(21) Appl. No.: 12/419,217

(22) Filed: Apr. 6, 2009

(65) Prior Publication Data

US 2010/0253309 A1    Oct. 7, 2010

(51) Int. Cl.
*G05F 1/00*    (2006.01)

(52) U.S. Cl. ......... 323/284; 323/283; 323/288; 323/224
(58) Field of Classification Search .................. 323/283, 323/284, 288, 224
See application file for complete search history.

(56) References Cited

U.S. PATENT DOCUMENTS 7,605,574 B2 * 10/2009 Dearn et al. .................. 323/284
7,750,615 B2 * 7/2010 Jung et al. ..................... 323/282

* cited by examiner

*Primary Examiner* — Shawn Riley
(74) *Attorney, Agent, or Firm* — Perkins Coie LLP (57) ABSTRACT

A DC-DC converter includes a switching stage and a control circuit coupled to provide an accurate current limit for peak current mode for the DC-DC converter. The control circuit is operative to provide a peak value of the peak current mode.

8 Claims, 8 Drawing Sheets

ACCURATE CURRENT LIMIT FOR PEAK CURRENT MODE DC-DC CONVERTER

TECHNICAL FIELD

The present invention relates to DC-DC converters, and more particularly to peak current mode controlled DC-DC converters.

BACKGROUND

Figure 1:
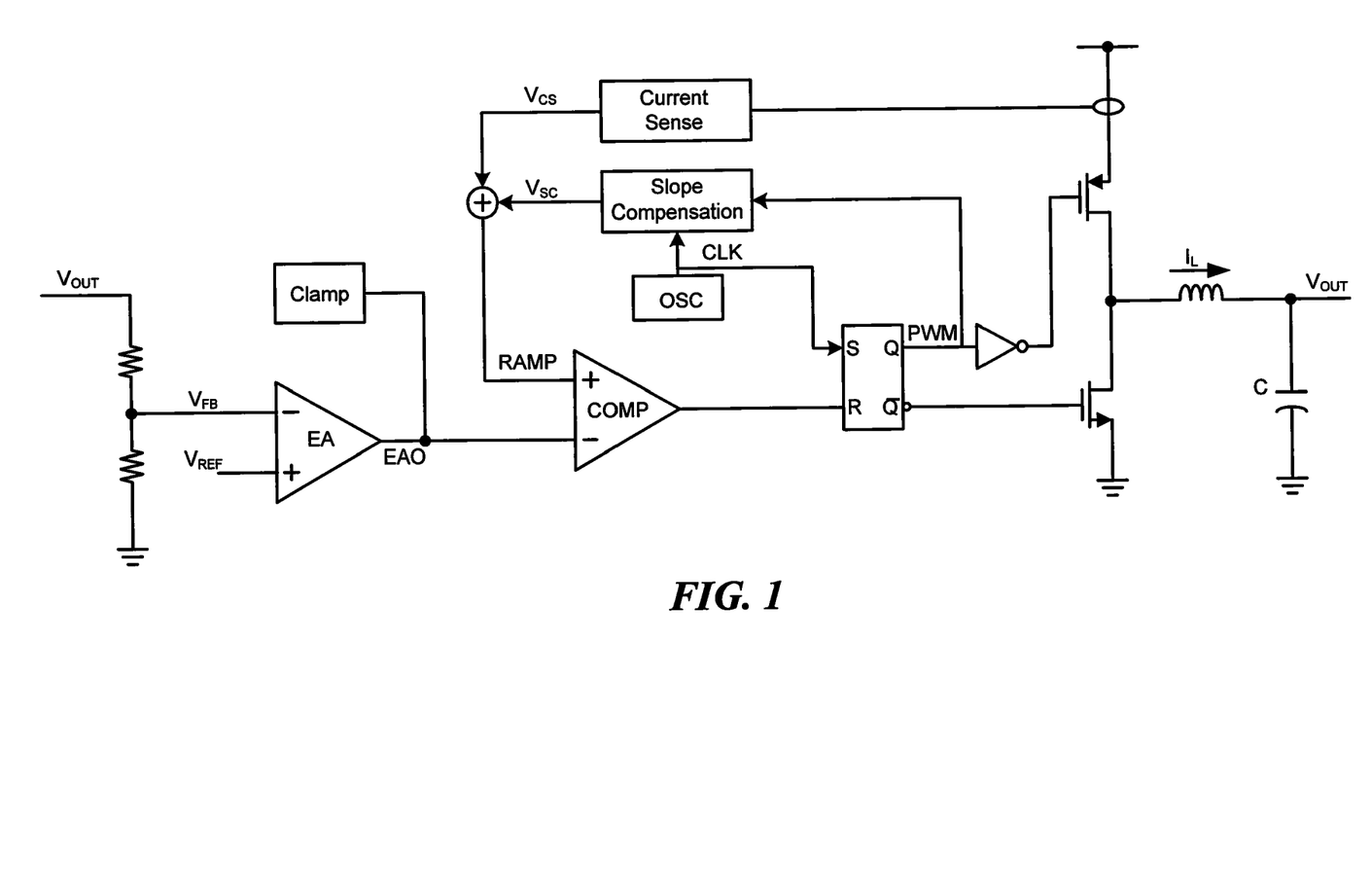
FIG. 1 is a conventional peak current mode controlled DC-DC converter in the prior art.

Peak current mode control is commonly used in DC-DC converters. It requires a slope compensation for stable operation when the duty cycle exceeds 50 percent. The slope compensation is added onto a sensed inductor current signal to set a limit of the inductor current. A conventional peak current mode controlled DC-DC converter is shown in FIG. 1.

As seen, there is a current sense block that senses the current flowing through a high-side switch. This current is equal to the inductor current when the high-side switch is turned on. There is also a slope compensation block providing a slope compensation signal added onto the sensed current to get a RAMP signal. The output voltage is fed back through a divider to an error amplifier. The difference between the feedback voltage $V_{FB}$ and the reference $V_{REF}$ is amplified by an error amplifier EA. The output of the error amplifier EAO is clamped by a clamp block, for example a Zener diode equivalent circuit, so as to set the limit of the peak inductor current.

The output of the error amplifier EAO and the RAMP signal is compared at a comparator COMP. At the start of each clock cycle, if RAMP signal is lower than EAO signal, a RS latch is set by the clock to turn on the high-side switch, and the inductor current starts to increase. The RAMP signal increases with the inductor current. When it increases to higher than the output of the error amplifier EAO, the comparator COMP outputs a high-level signal to reset the RS latch, so that the high-side switch in the switching stage is turned off, and a low-side switch in the switching stage is turned on. As a result, the inductor current decreases. This can be seen in FIG. 2.

Figure 2:
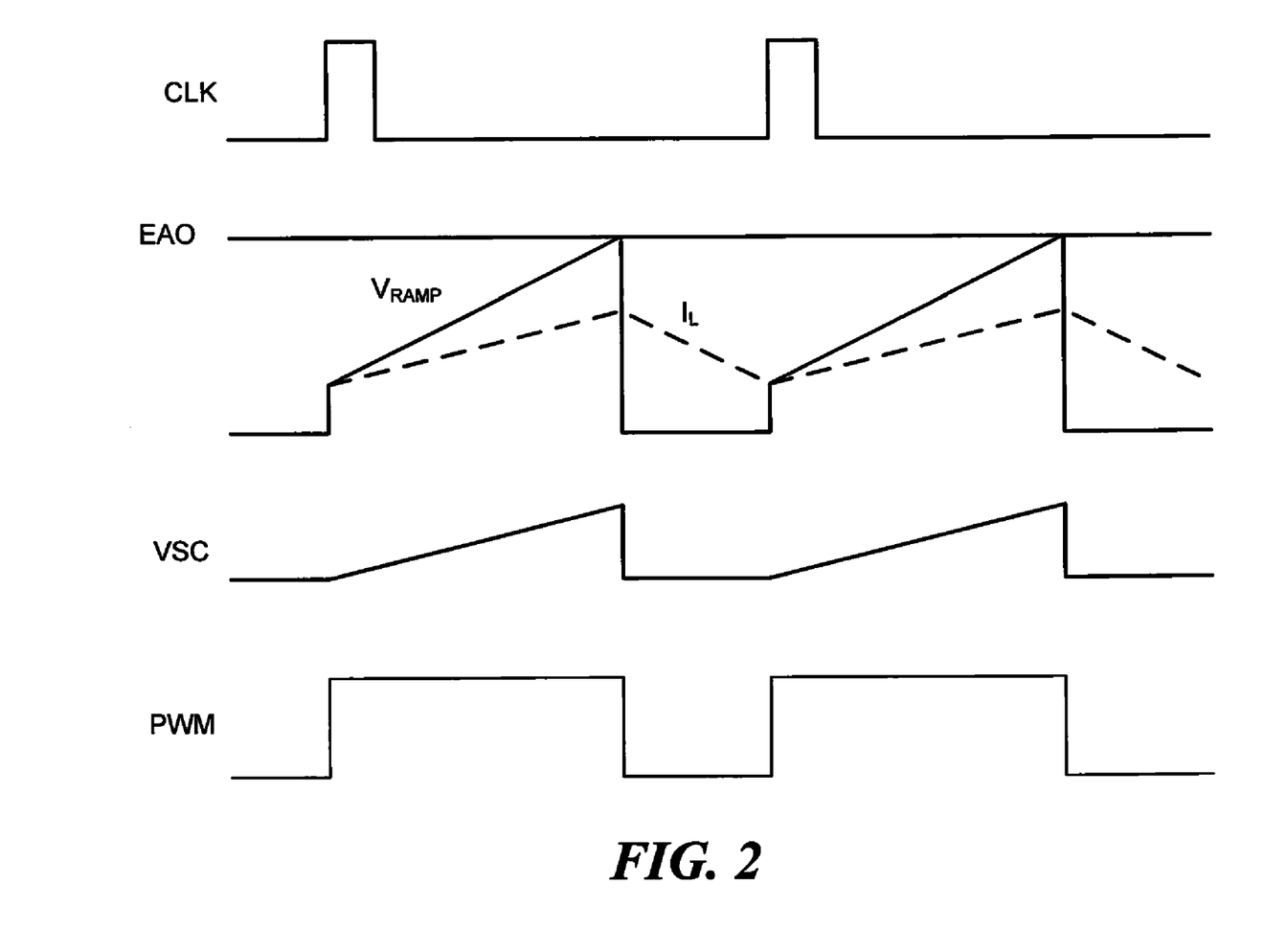
FIG. 2 depicts the waveforms of different signals in the converter shown in FIG. 1.

As illustrated above, the sum of the slope compensation signal $V_{SC}$ and the sensed peak inductor current $V_{CS}$ is equal to the output of the error amplifier EAO through such regulation.

Since EAO level is the sum of the slope compensation signal $V_{SC}$ and the sensed peak inductor current $V_{CS}$, for a given clamped EAO level, the actual inductor peak current varies with the amplitude of the slope compensation signal, which ultimately depends on the duty cycle. This variation is especially large or unacceptable for high duty cycle operation, where the amplitude of the slope compensation signal could be significantly larger than the sensed inductor current signal, i.e., peak of $V_{SC}$ >> peak of $V_{CS}$.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3:
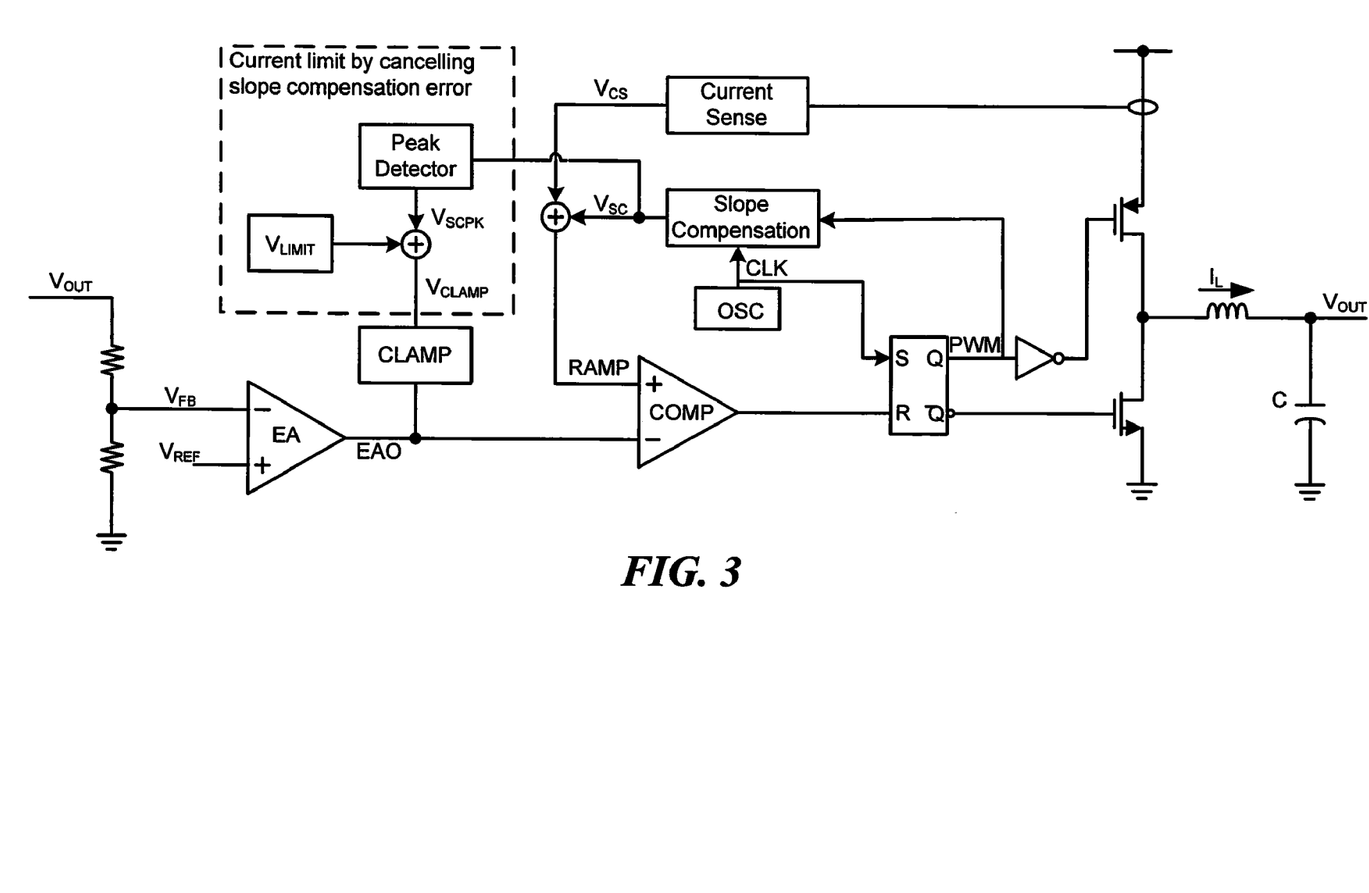
FIG. 3 is a DC-DC converter 100 with a slope compensation peak detector added into the clamp voltage in accordance with an embodiment of the present invention.
Figure 4:
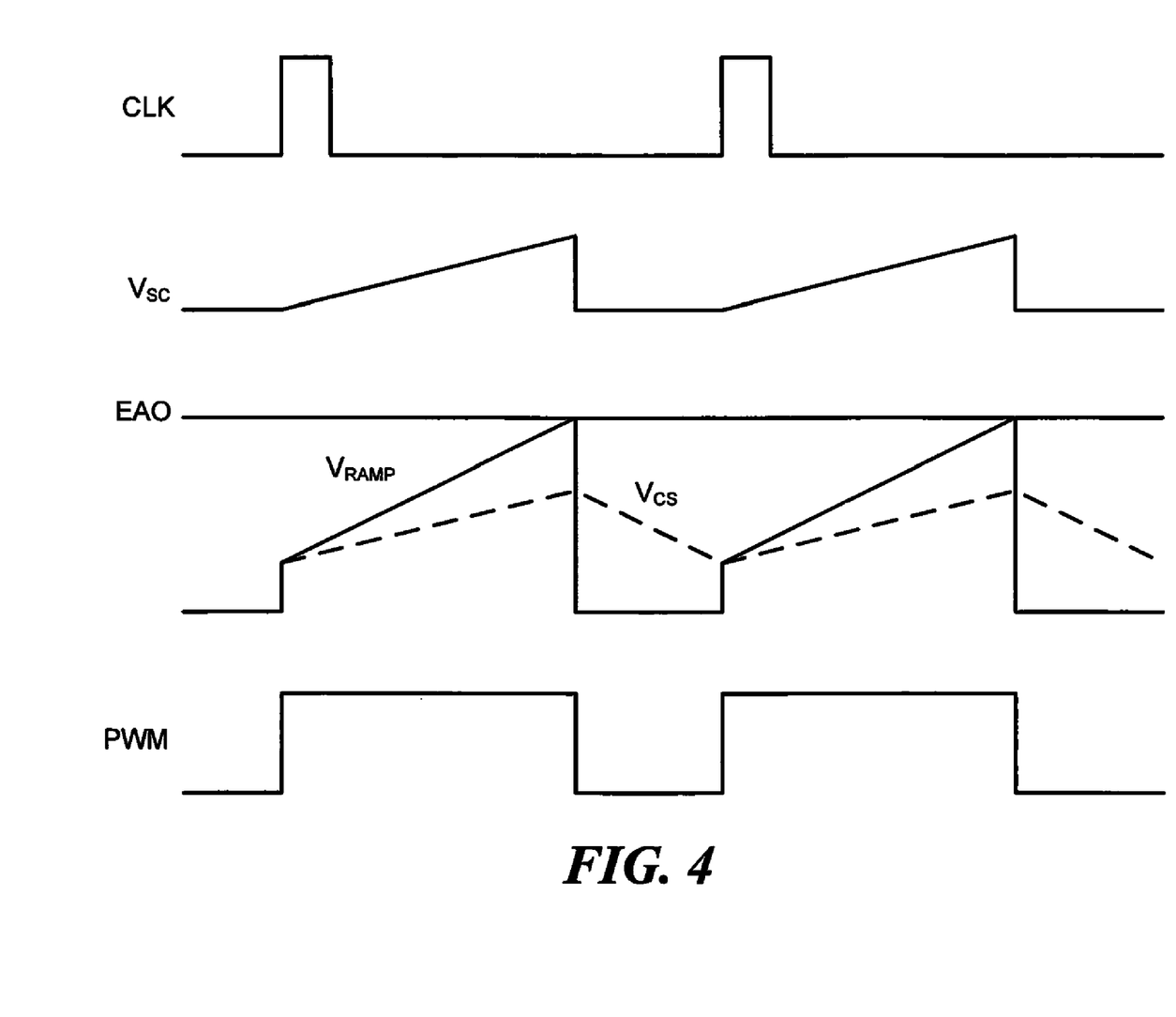
FIG. 4 depicts the waveforms of different signals in converter 100 shown in FIG. 3.

Now referring to FIG. 3, a DC-DC converter 100 with a slope compensation peak detector added into the clamp voltage portion in accordance with an embodiment of the present invention is illustrated. As shown in FIG. 3, converter 100 comprises an output stage electrically coupled between an input port of converter 100 and ground, a L-C filter electrically coupled to the output stage, and a control stage electrically coupled to provide control signals to the output stage. The control stage comprises a divider which is electrically coupled to derive a feedback signal $V_{FB}$ from an output port of converter 100. The feedback signal $V_{FB}$ is compared with a reference $V_{REF}$, and the difference between them is amplified by an error amplifier EA. The control stage further comprises a current sense block which senses the current flowing through a high-side switch at the output stage. An oscillator provides a CLK signal and a slope compensation signal. A comparator COMP receives both the sensed current signal and slope compensation signal at its non-inverting input terminal and receives the output of the error amplifier EAO at its inverting input terminal. The control stage further comprises a peak detector which detects the peak value of the slope compensation signal, and a clamp block which clamps the sum of the sensed current signal and the slope compensation signal and the preset limit of the inductor peak current. In one embodiment, the divider is comprised of two resistors.

During operation, the current sense block senses the current flowing through the high-side switch at the output stage and sends the sensed current signal $V_{CS}$ to the non-inverting input terminal of the comparator COMP. The current flowing through the high-side switch is the inductor current when the inductor current is increasing. The oscillator OSC provides a CLK signal to the slope compensation block and to the set terminal of the RS latch. The slope compensation block receives the CLK signal from the oscillator OSC and a PWM signal which is used to drive the switches at the output stage. The slope compensation signal $V_{SC}$ is also provided to the non-inverting input terminal of the comparator COMP and the peak detector.

The non-inverting input terminal of the comparator COMP receives a combination (in one embodiment the arithmetic sum) of the sensed current signal $V_{CS}$ and the slope compensation signal $V_{SC}$. The combination is a signal RAMP. Note that the combination may be weighted in other embodiments. The peak detector detects the peak value of the slope compensation signal $V_{SC}$, and sends a detected signal $V_{SCPK}$ to the clamp block which also receives a preset limit $V_{LIMIT}$. The error amplifier EA amplifies the difference between the reference $V_{REF}$ and the feedback signal $V_{FB}$ which is derived from the output port of converter 100 by the divider. The output of the error amplifier EAO is clamped by the clamp block which is determined by the sum of the preset limit $V_{LIMIT}$ and the detected signal $V_{SCPK}$. Next, the error amplifier delivers its output EAO to the inverting input of the comparator COMP.

The comparator COMP compares the output of the error amplifier EAO and the signal RAMP. If RAMP is higher than EAO, the comparator COMP outputs a high-level signal to the reset terminal of the RS latch. However, if RAMP is lower than EAO, the comparator COMP outputs a low-level signal to the reset terminal of the RS latch.

The RS latch receives the output of the comparator COMP at its reset terminal and the CLK signal at its set terminal. The reset terminal has priority to the RS latch. When a rising edge of the CLK comes, and if RAMP is lower than EAO at the time, the RS latch is set and provides a high-level output Q. When a rising edge of the COMP signal comes, the RS latch is reset and provides a low-level output Q. When no rising edge of both CLK signal and COMP signal comes, the RS latch's output keeps as it was. Thereupon, the output of the RS latch is a PWM signal. The high-level PWM signal turns on the high-side switch at the output stage through the inverter since the high-side switch is a P-channel MOSFET, and turns off the low-side switch at the output stage. In contrast, the low-level PWM signal turns off the high-side switch and turns on the low-side switch.

In such a way, the current limit error caused by the slope compensation is cancelled. The peak detector can be implemented in various ways. For example, below is illustrated two examples wherein one is in voltage domain and the other is in current domain.

Figure 5:
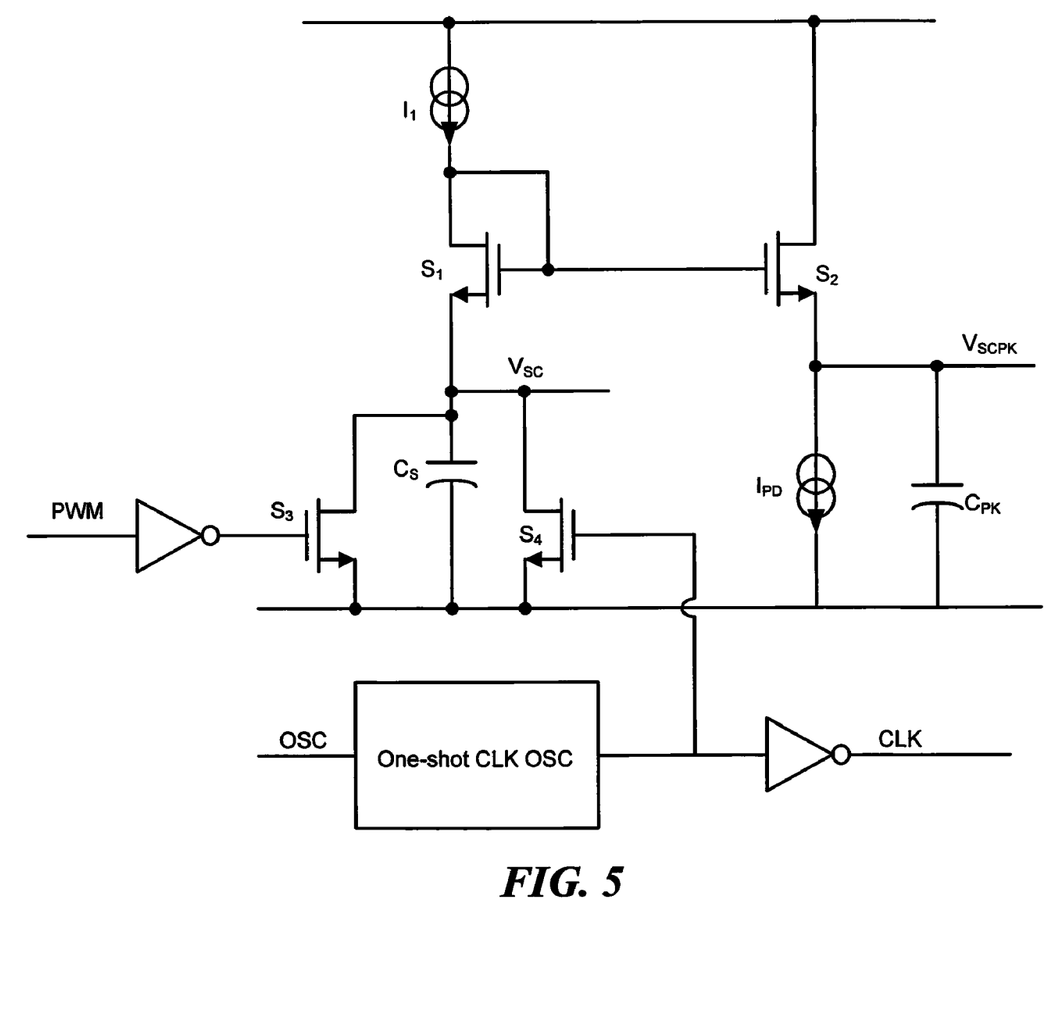
FIG. 5 depicts one implementation of the peak detector of FIG. 3 implemented in the voltage domain.

Referring to FIG. 5, the peak detector implemented in the voltage domain is illustrated. As shown in FIG. 5, the peak detector comprises a voltage follower, a saw-tooth generator, and a peak detect capacitor $C_{PK}$ connected as shown. In one embodiment, the voltage follower comprises a first MOSFET $S_1$, a second MOSFET $S_2$, a first current source $I_1$, and a second current source $I_{PD}$. The gate and the drain of the first MOSFET $S_1$ and the drain of the second MOSFET $S_2$ are coupled together. Thus, $S_1$ shifts up the voltage by one $V_t$ while $S_2$ shifts down the voltage by one $V_t$, wherein $V_t$ is the threshold voltage between the gate and the source of a MOSFET. The first current source $I_1$ is coupled to the drain of the first MOSFET $S_1$ to provide a constant current flowing through the first MOSFET $S_1$. The second current sauce $I_{PD}$ is in parallel with the peak detect capacitor $C_{PK}$, which is coupled between the source of the second MOSFET $S_2$ and ground to provide weak pull down of the peak voltage $V_{SCPK}$, wherein $I_{PD}$ and $C_{PK}$ should be chosen that, $$\frac{I_{PD} * T_S}{C_{PK}}$$

is much less than $V_{SCPK}$. The saw-tooth generator comprises a capacitor $C_S$, a third switch $S_3$, and a fourth switch $S_4$ coupled in parallel to each other between the source of the first MOSFET $S_1$ and ground. The third switch $S_3$ is controlled by the gate control signal of the high-side switch which is an reversed PWM signal. The fourth switch $S_4$ is controlled by a reversed CLK signal which is output from the One-shot CLK oscillator.

Figure 6:
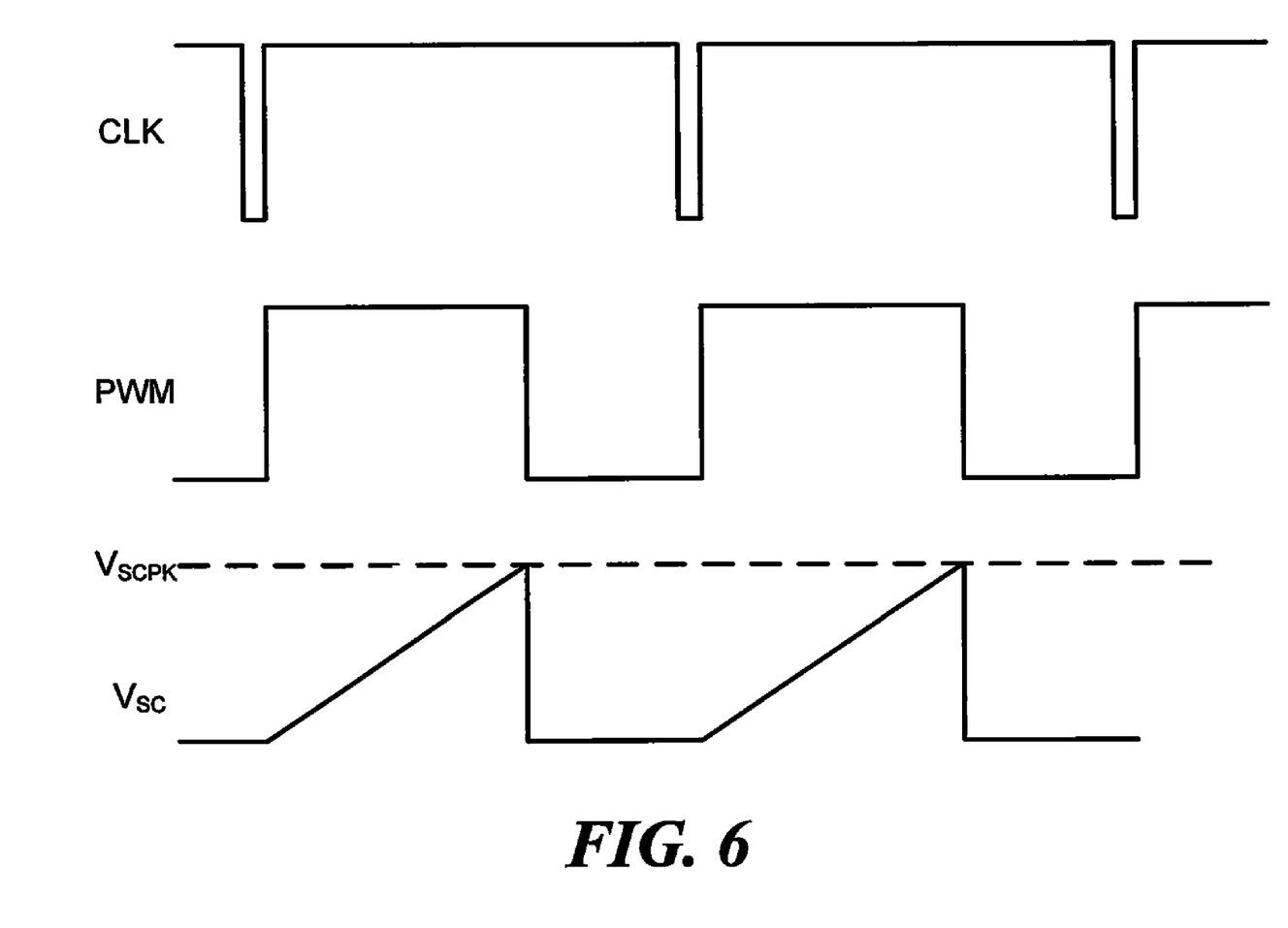
FIG. 6 depicts the waveforms of different signals in the peak detector shown in FIG. 5.

When one-shot CLK oscillator outputs a short high pulse, the fourth switch $S_4$ is turned on shortly, and is turned off after the short pulse. Thus the CLK signal is a short low pulse and then goes high. The high-level CLK signal sets the RS latch, causing the PWM signal to be high, this high-level signal turns on the high-side switch $M_1$ and turns off the low-side switch $M_2$ at the output stage. This high-level signal turns off the third switch $S_3$ at the saw-tooth generator, causing the capacitor $C_S$ to be charged by the first current source $I_1$, as shown in FIG. 6. Due to the voltage follower, and $$\frac{I_{PD} * T_S}{C_{PK}}$$

is much less than $V_{SCPK}$, the voltage across the detect capacitor $C_{PK}$ is equal to that of the capacitor $C_S$. When the PWM signal turns low, the third switch $S_3$ is turned on, causing the capacitor $C_S$ to be discharged quickly. As a result, the gate of the second MOSFET $S_2$ is low, causing the second MOSFET $S_2$ to be turned off and the voltage on capacitor $C_{PK}$ is preserved. Thus, the voltage across the peak detect capacitor $C_{PK}$ reflects the peak value of the saw-tooth signal $V_{SC}$.

Figure 7:
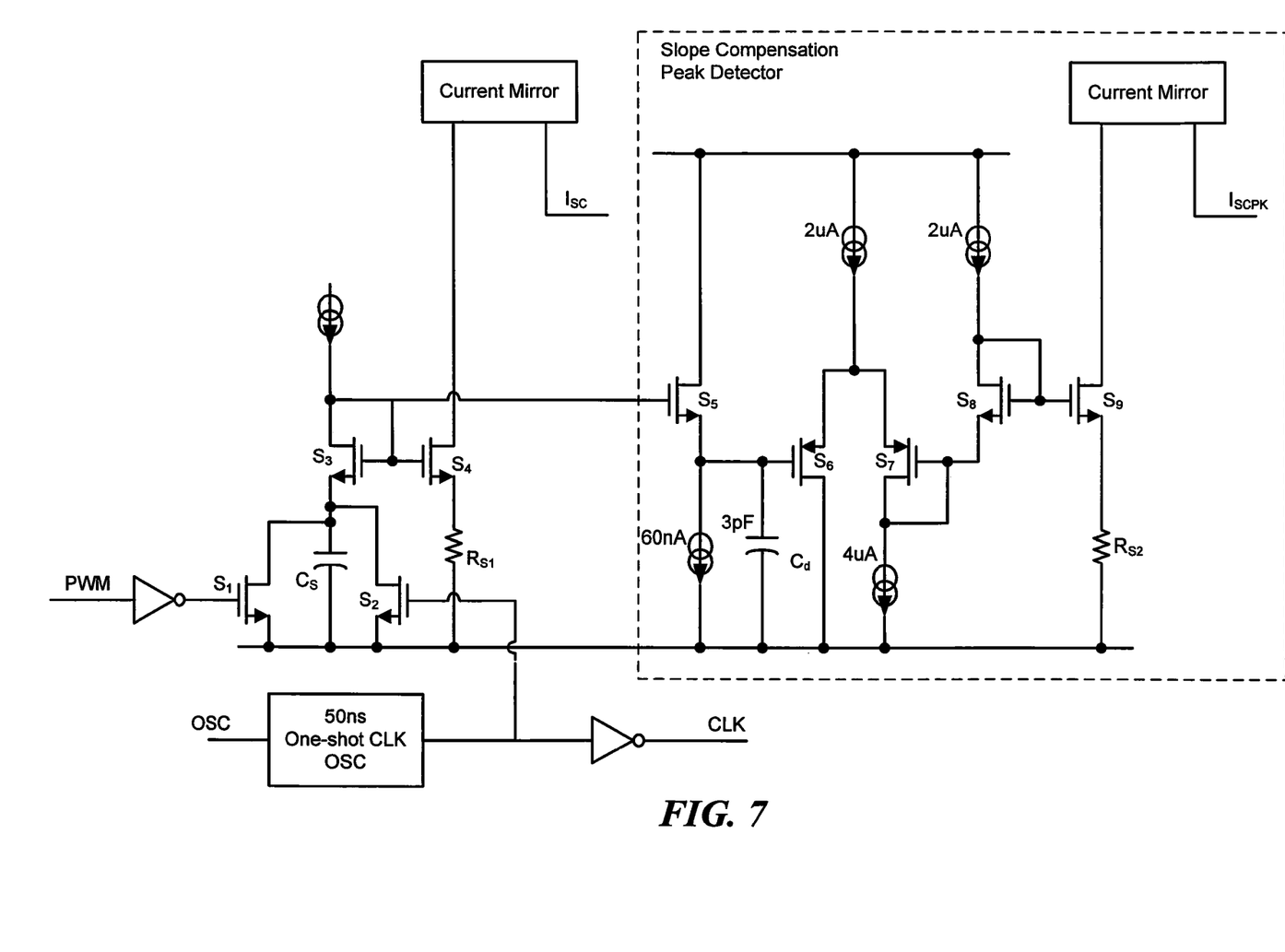
FIG. 7 depicts one implementation of the peak detector of FIG. 3 implemented in the current domain.
Figure 8:
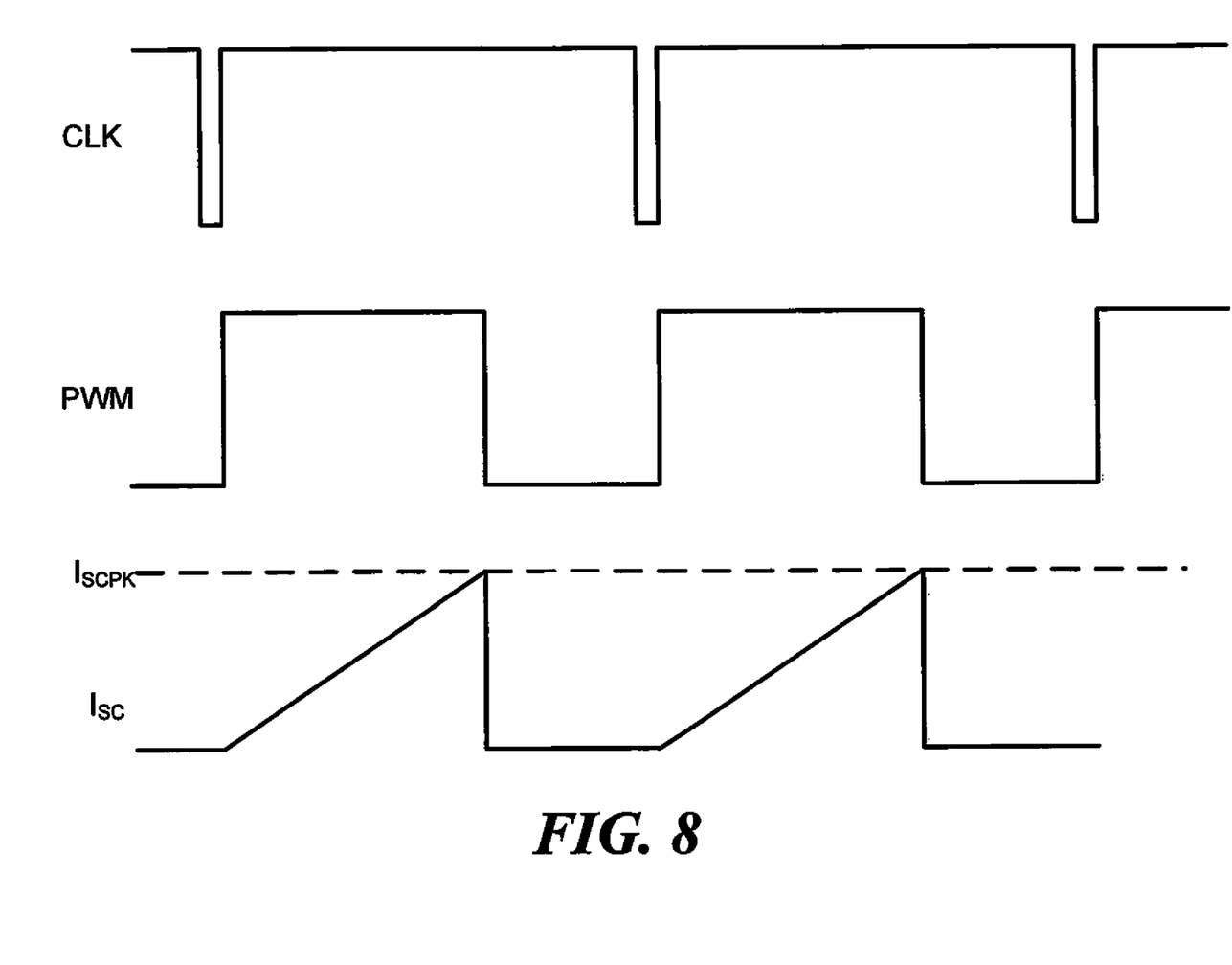
FIG. 8 depicts the waveforms of different signals in the peak detector shown in FIG. 7.

Referring to FIG. 7, the peak detector implemented in the current domain is illustrated. As shown in FIG. 7, the peak detector comprises a current mirror providing the final signal $I_{SCPK}$, a plurality of MOSFETs, three current sources, a resistor $R_{S2}$, and a capacitor Cd connected as show.

When one-shot CLK oscillator outputs a short high pulse, the second switch $S_2$ is turned on shortly, and is turned off after the short pulse. Thus the CLK signal is a short low pulse and then goes high. The high-level CLK signal sets the RS latch, causing the PWM signal to be high, this high-level signal turns on the high-side switch $M_1$ and turns off the low-side switch $M_2$ at the output stage. This high-level signal turns off the first switch $S_1$, causing the capacitor $C_S$ to be charged by the first current source $I_1$. When PWM goes low, the first switch $S_1$ is turned on, causing the capacitor $C_S$ to be discharged quickly. Thus the voltage across the capacitor $C_S$ is a slope signal.

As the signal flowing through MOSFET $S_4$ follows that of switch $S_3$, the voltage across a resistor $R_{S1}$ is a slope signal as well. Thus the current flowing through the resistor $R_{S1}$ is a slope signal, too. As a result, the signal $I_{SC}$ is a slope signal via the current mirror.

Since the capacitor $C_d$ is discharged only by a very small current source, the voltage across the capacitor $C_d$ is almost equal to the peak of the slope signal. Through a level shift and buffering by MOSFET $S_6$, $S_7$, $S_8$ and $S_9$, the voltage across the resistor $R_{S2}$ is at the same level as on capacitor $C_d$. Thus the signal $I_{SCPK}$ is equal to the current flowing through the resistor $R_{S2}$, which is the peak of the slope signal $I_{SCPK}$.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A DC-DC converter, comprising:
a switching stage, electrically coupled to receive an input signal at an input port and provide an output signal at an output port; and
a control circuit, electrically coupled to provide an accurate current limit for peak current mode for said DC-DC converter, said control circuit operative to provide a peak value of said peak current mode, wherein the control circuit comprises:
   a current sense block, electrically coupled to sense the current flowing through a high-side switch at said switching stage;
   a slope compensation block, electrically coupled to receive a CLK signal from an oscillator and a PWM signal which is used to drive switches at said switching stage, and provide a slope compensation signal;
   a peak detector, electrically coupled to detect the peak value of said slope compensation signal;
   a clamp circuit, electrically coupled to receive the peak value of said slope compensation signal and a preset limit;
   a divider, electrically coupled to derive a feedback signal from said output port of said DC-DC converter;
   an error amplifier, electrically coupled to amplify the difference between said feedback signal and a reference;
   a comparator, electrically coupled to receive the sum of said slope compensation signal and said sensed current at a first input terminal, and receive the output of said error amplifier at a second input terminal; and
   a RS latch, electrically coupled to receive said CLK signal at its set terminal, receive the output of said comparator at its reset terminal, and provide said PWM signal to said switching stage.

2. The DC-DC converter of claim 1, wherein the output terminal of said error amplifier is coupled to said clamp circuit.

3. The DC-DC converter of claim 1, wherein said peak detector comprises a voltage follower, a saw-tooth generator, and a peak detect capacitor.

4. The DC-DC converter of claim 3, wherein said voltage follower comprises a first current source, a second current source, a first MOSFET, and a second MOSFET.

5. The DC-DC converter of claim 4, wherein
said first switch is electrically coupled to receive current from said first current source;
said second switch is electrically coupled to get current flow into said second current source;
the gate and the drain of said first MOSFET and the drain of said second MOSFET are coupled together to form said voltage follower.

6. The DC-DC converter of claim 3, wherein
said saw-tooth generator comprises a detect capacitor, a third switch, and a fourth switch.

7. The DC-DC converter of claim 6, wherein
said detect capacitor is electrically coupled to receive current from said first current source;
said third switch and said fourth switch are coupled in parallel with said detect capacitor;
said third switch is controlled by a PWM signal, said fourth switch is controlled by said CLK signal.

8. The DC-DC converter of claim 1, wherein said peak detector comprises a current mirror, a plurality of MOSFETs, a plurality of current sources, a resistor and a capacitor.

* * * * *